United States Patent
Vitanescu

(10) Patent No.: US 8,112,569 B2
(45) Date of Patent: Feb. 7, 2012

(54) INTEGRATED CIRCUIT AND ELECTRONIC DEVICE

(75) Inventor: Mihai Vitanescu, Zurich (CH)

(73) Assignee: NXP B.V., Eindhoven (NL)

( * ) Notice: Subject to any disclaimer, the term of this patent is extended or adjusted under 35 U.S.C. 154(b) by 387 days.

(21) Appl. No.: 12/526,768

(22) PCT Filed: Feb. 13, 2008

(86) PCT No.: PCT/IB2008/050521
§ 371 (c)(1),
(2), (4) Date: Aug. 11, 2009

(87) PCT Pub. No.: WO2008/102284
PCT Pub. Date: Aug. 28, 2008

(65) Prior Publication Data
US 2010/0030936 A1 Feb. 4, 2010

(30) Foreign Application Priority Data
Feb. 19, 2007 (EP) .................... 07102663

(51) Int. Cl.
*G06F 13/14* (2006.01)
(52) U.S. Cl. ........................ 710/305; 711/200
(58) Field of Classification Search .............. 710/305, 710/104, 107, 3–4; 711/200, 214, 217; 370/389, 370/392
See application file for complete search history.

(56) References Cited

U.S. PATENT DOCUMENTS

| | | |
|---|---|---|
| 6,745,270 B1 | 6/2004 | Barenys et al. |
| 2004/0267991 A1 | 12/2004 | Delaney |
| 2005/0108454 A1 | 5/2005 | Baker et al. |

FOREIGN PATENT DOCUMENTS

WO 2006117753 A 11/2006

OTHER PUBLICATIONS

Philips Semiconductors Application Note XX, XX; Application Note AN469-12C/SMBUS General Purpose I/O Expanders Rev. 02; Jan. 20, 2005; pp. 1-44.

*Primary Examiner* — Clifford Knoll

(57) ABSTRACT

An IC (100) for communicating over a data communication bus (220) comprising a first pair of conductors including a data signal conductor (SDA) and a synchronization signal conductor (SCL), e.g. an $I^2C$ bus, is disclosed. The IC comprises a group of address pins (106a-c) for defining the bus address of the integrated circuit (100), each address pin being arranged to be coupled to a conductor from a group of conductors comprising the first pair of conductors and a second pair of conductors including a conductor for carrying a fixed high potential (Vdd) and a conductor for carrying an fixed low potential (GND). The IC (100) further comprises first and second further pins (102, 104) for being coupled to the data signal conductor (SDA) and the synchronization signal conductor (SCL) respectively and a bus address decoder (110) comprising, for each address pin, first means (118) for distinguishing between the first pair of conductors and the second pair of conductors and second means (112, 116) for distinguishing between the conductors belonging to the same pair of conductors. The IC (100) of the present invention provides an area-efficient implementation of an address decoder (110) capable of decoding addresses in an enhanced addressing scheme. In addition, an electronic device (200 comprising a data communication bus (220) and an IC (100) coupled to the data communication bus (220) is disclosed.

10 Claims, 2 Drawing Sheets

INTEGRATED CIRCUIT AND ELECTRONIC DEVICE

Figure 1:
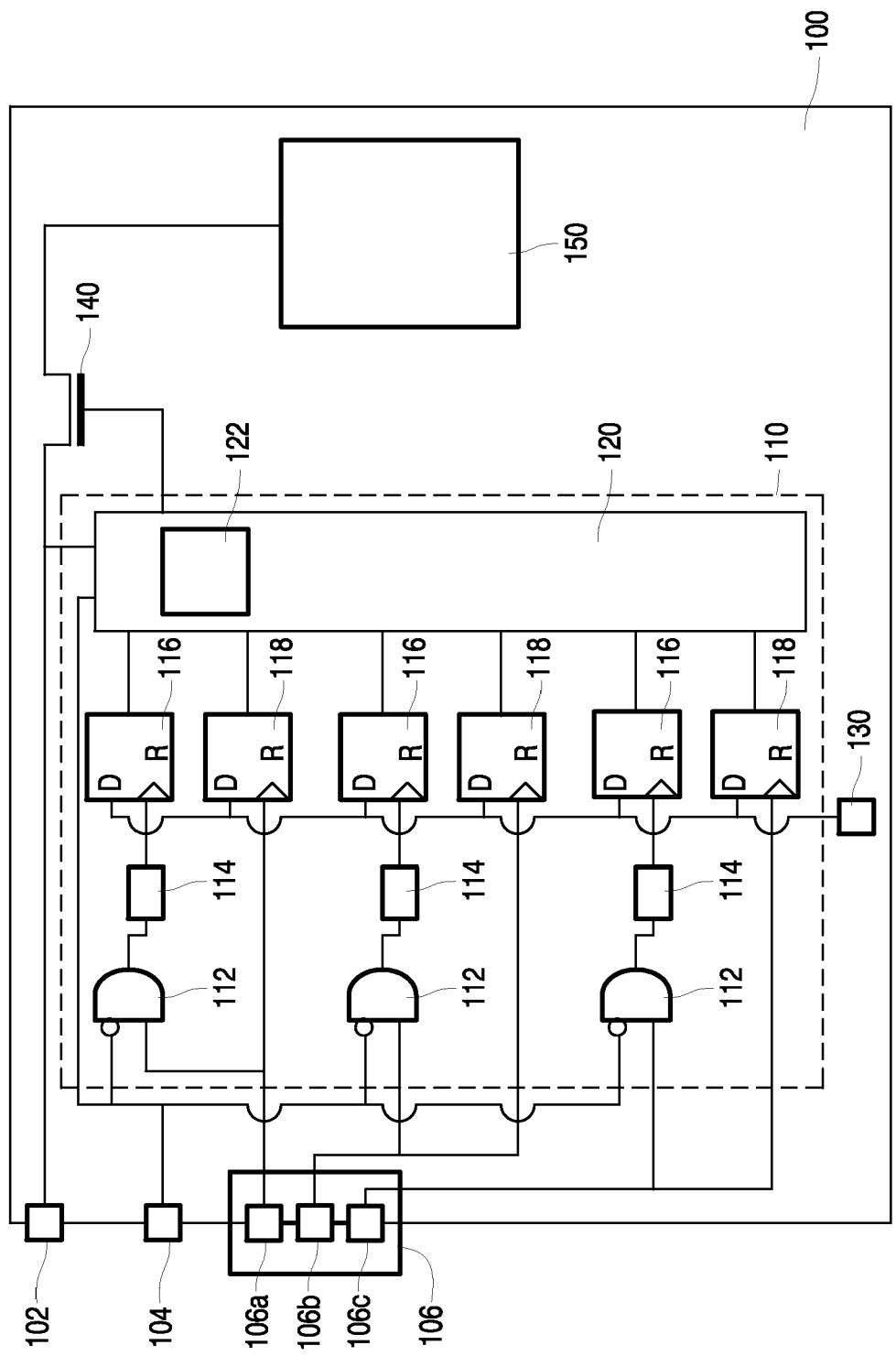

The present invention relates to an integrated circuit for communicating over a data communication bus comprising a first pair of conductors including a data signal conductor and a synchronization signal conductor, the integrated circuit comprising a group of address pins for defining the bus address of the integrated circuit, each address pin being arranged to be coupled to a conductor from a group of conductors comprising the first pair of conductors and a second pair of conductors including a conductor for carrying a fixed high potential and a conductor for carrying an fixed low potential; first and second further pins for being coupled to the data signal conductor and the synchronization signal conductor respectively; and a bus address decoder.

The present invention further relates to an electronic device comprising a data communication bus coupled to such an integrated circuit.

Electronic devices including a plurality of integrated circuits (ICs) typically comprise a data communication bus to facilitate data communication between the ICs, with each IC having a fixed address associated with the data communication bus to allow data communication to the appropriate IC. To this end, an IC that is suitable for connection to such a data bus typically has a number of address pins to be tied to a fixed logic value such that the address pins represent the bus address of the IC.

An example of such a system is the I²C bus, which is a data communication bus developed by Philips to facilitate inter-IC communication. According to the I²C standard, each device to be coupled to the bus can have an address defined by a number of address pins tied to fixed signals. For instance, in the case of three address pins, a total of $2^3=8$ devices can be addressed using the original I²C addressing scheme.

It is undesirable to have a large number of address pins, because this reduces the number of pins available to establish the necessary communication with external devices. However, a small number of pins, e.g. three pins, limits the number of devices that can be addressed via the bus to a maximum of eight, which may not be sufficient. For this reason, an enhanced addressing scheme suitable for use within the I²C standard has been developed. In this schedule, the address pins of an IC may be coupled to the data signal wire (SDA) of the I²C bus, the clock signal wire (SCL) of the I²C bus, to power supply (Vdd) line or to the ground supply (GND) line. The connection of an address pin to one of these four conductors can be seen as the address pin assuming of one of four possible states, thus allowing a total of $4^3=64$ devices to be addressable when connected to the bus when three address pins are used.

However, it is not straightforward to detect which conductor each address pin is connected to, and, as a consequence, to determine the bus address of the IC. For this reason, the bus address decoder of an IC using such an enhanced addressing scheme typically comprises a substantial amount of logic to determine the respective states of the address pins of the IC, which has a detrimental effect on the area overhead of the bus address decoder. An example of an IC using such an enhanced addressing scheme and having a relatively large address decoder can be found in PCT patent application WO 2006/117753.

The present invention seeks to provide an IC according to the opening paragraph that has a relatively compact bus address decoder.

The present invention further seeks to provide an electronic device comprising an IC according to the present invention.

According to a first aspect of the present invention, there is provided an IC according to the opening paragraph, wherein the bus address decoder, for each address pin, comprises first means for distinguishing between the first pair of conductors and the second pair of conductors; and second means for distinguishing between the conductors belonging to the same pair of conductors.

The present invention is based on the realization that by treating the conductors to which the address pins can be connected as a first pair of conductors that exhibit different time-variational signal behaviour and a second pair of conductors that exhibit different time-constant signal behaviour, a distinction can be easily made between the pairs of conductors as well as between the conductors within in a pair. This allows for an area-efficient implementation of the decoding logic of the address decoder.

In a preferred embodiment, each first means and second means comprise a sequential element having a data terminal coupled to a fixed logic value that is the complement of the logic value assumed by the sequential element in an initial state and a control terminal coupled to its associated address pin; the sequential element of each first means being an edge-triggered sequential element, and the control terminal of the sequential element of each second means being coupled to its associated address pin via a logic gate having a first input coupled to the associated address pin and a second input arranged to be coupled to a conductor from the first pair of conductors, one of the first and second input of the logic gate being an inverting input.

The use of an edge-triggered sequential element such as edge-triggered flip-flops in each first means makes it possible to immediately distinguish between time-variational and time-constant signals, and therefore to distinguish between the first and second pairs of conductors, whereas the use of a logic gate such as an AND gate or a NOR gate with one inverting input makes it possible to distinguish between conductors belonging to the same pair of conductors. The inverting gate ensures that if the inputs of the logic gate are connected to the same two conductors, the logic gate will never provide a logic high output, whereas if the logic gates are connected to different conductors, a logic high will be produced at some stage during the address cycle over a data communication bus provided that both conductors are capable of reaching the required voltage potential to generate the logic high, as will be discussed in more detail later. The output of the logic gate is captured in a sequential element, which may also be an edge-triggered sequential element, although this is not necessary. Consequently, only three logic elements are required per bus address pin to determine the bus address of the IC, thus providing an area-efficient implementation of the address decoder.

The bus address decoder may be further coupled to the first further pin, and is arranged to receive an address bit pattern through the first further pin and to compare the received address bit pattern with the decoded bus address. This can be implemented in a number of ways. The bus address decoder may be arranged to compare the bit pattern received over the first further pin in the address cycle over the bus with the bit pattern stored in the sequential elements of the respective first and second means.

Alternatively, the bus address decoder may comprise a look-up table stored in a programmable logic device, the look-up table comprising a plurality of address bit patterns and a plurality of corresponding combinations of three conductors from the group of conductors, the bus address decoder being arranged to locate the received address bit pattern in the look-up table and to compare the corresponding conductor combination in the look-up table with the conductor combination derived from the group of pins. This has the advantage that the address of the IC may be changed by reprogramming the programmable logic device.

Preferably, each control input of an edge-triggered sequential element that is coupled to a logic gate is coupled to said logic gate via a signal spike filter in order to filter out spikes in the output signal of the logic gates caused by skew or spikes in one of the input signals of the logic gate.

It is further preferable that each sequential element comprises a reset terminal responsive to a reset signal indicating the start or termination of a data communication over the data communication bus, each edge-triggered sequential element being arranged to assume its initial state logic value in response to the reset signal. The option to reset the sequential elements before or after a data communication ensures that these elements have a well-defined state at the beginning of an address cycle over the data communication bus.

According to a further aspect of the present invention, there is provided a data communication bus comprising a first pair of conductors including a data signal conductor and a synchronization signal conductor; a second pair of conductors including a first conductor for carrying a fixed high potential and a further conductor for carrying a fixed low potential; and an integrated circuit according to the present invention having the first further pin coupled to the data signal conductor; the second further pin coupled to the synchronization signal conductor; and each pin of the group of pins coupled to a conductor from the first pair of conductors or the second pair of conductors.

Figure 2:
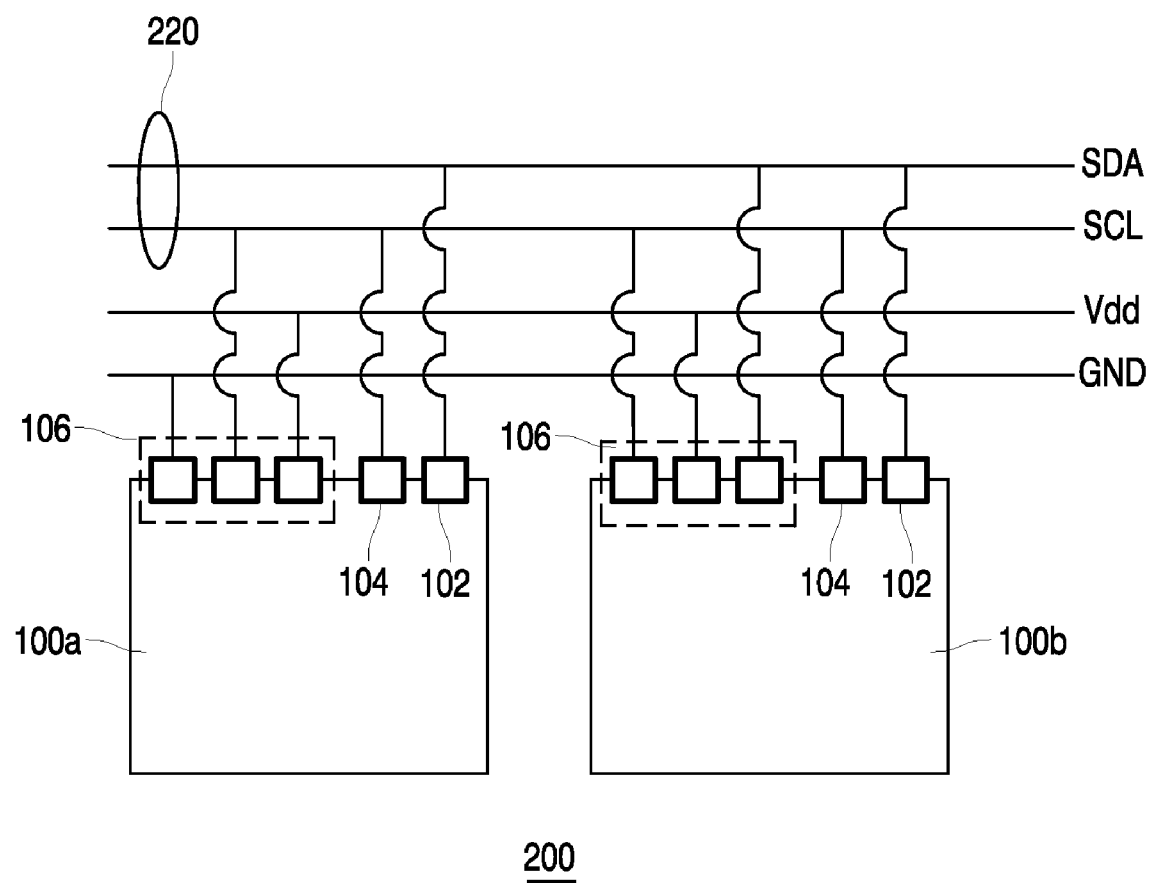

The invention is described in more detail and by way of non-limiting examples with reference to the accompanying drawings, wherein:

FIG. 1 shows an IC comprising an address decoder according to an embodiment of the present invention; and FIG. 2 shows an embodiment of an electronic device of the present invention.

It should be understood that the Figures are merely schematic and are not drawn to scale. It should also be understood that the same reference numerals are used throughout the Figures and their detailed description to indicate the same or similar parts.

FIG. 1 shows a preferred embodiment of an IC 100 according to the present invention. The IC 100 has a group 106 of address pins 106a-c for defining the bus address of the IC 100 using a four-state logic encoding scheme such as the enhanced addressing scheme as disclosed in PCT patent application WO 2006/117753. The IC 100 comprises a first further pin 102 connectable to a data signal conductor of a data communication bus and a second further pin 104 connectable to a synchronization signal conductor of the data communication bus, e.g. a clock signal conductor.

The IC 100 further comprises a bus address decoder 110 coupled to the first further pin 102, the second further pin 104 and the group 106 of address pins 106a-c. The bus address decoder is typically arranged to receive an address through the first further pin 102 during an address cycle of the data communication bus. Such an address cycle typically comprises the sequential transmission of a plurality of address bits under control of the synchronization signal, e.g. a clock signal, provided through second further pin 104. The bus address decoder 110 is arranged to compare the received address with the address of the IC 100 and facilitate communication between the data communication bus and the internals of the IC 100, e.g. a data processing unit 150 for instance by enabling a switch 140 in case the address received in the address cycle matches the address of the IC 100.

The bus address decoder 110 is arranged to determine the bus address of the IC 100 in the following manner. For each of the address pins 106a-c, the bus address decoder 110 comprises first decoding logic for determining if the address pin, e.g. address pin 106a is connected to a conductor carrying a fixed potential value such as a logic high value or a logic low value, or to a conductor carrying a time-variable signal such as a clock signal or a data signal. Such decoding logic may be implemented by an edge-triggered sequential element 118 having its control terminal coupled to its associated address pin. An edge-triggered sequential element is an element that captures the data on its data terminal D when detecting a transition between two complementary logic states on its control terminal, i.e. a transition from a logic high to a logic low or vice versa. Edge-triggered elements such as edge-triggered flip-flops are commonly used in digital circuits operating at twice the frequency of the principal clock frequency of such a circuit, because each clock frequency period comprises two edges (a rising edge and a falling edge) that each trigger the edge-triggered sequential element.

It will be appreciated that for the first decoding logic to be able to detect a transition on an address pin 106 coupled to the data signal conductor of the data communication bus, the conductor to which the address pin 106 is coupled must exhibit at least one signal transition during the address communication cycle of the data communication bus. For this reason, the use of all '1' and all '0' addresses is prohibited to ensure that a data transition takes place on the data signal conductor of the data communication bus, e.g. the SDA wire of an $I^2C$ bus, during its address cycle.

The edge-triggered sequential elements 118 are arranged to reset to a predefined logic value, e.g. a logic '0', with their respective data terminals D coupled to a complementary fixed logic value source 130, e.g. a pull-up transistor providing a logic '1'. In FIG. 1, all edge-triggered sequential elements 118 share a common fixed logic value source 130 by way of non-limiting example only; it is equally feasible that each edge-triggered sequential elements 118 is coupled to a separate fixed logic value source 130, with each separate fixed logic value source 130 providing the logic complement of the reset logic value of the associated edge-triggered sequential element 118. Consequently, an edge-triggered sequential element 118 holding the complement of its initial logic value is an indication of the detection of an edge on the control terminal of the edge-triggered sequential element 118, thus indicating the connection of the control terminal to a conductor carrying a time-variational signal.

For each of the address pins 106a-c, the bus address decoder 110 further comprises further decoding logic for determining to which of the time-variable signal carrying conductors or to which of the time-constant, i.e. fixed value, signal carrying conductor the address pin, e.g. address pin 106a is connected. This may be implemented in the following way. For each address pin, a logic gate 112 is provided that has an input coupled to the associated address pin and to one of the first further pin 102 or second further pin 104. In other words, the logic gate 112 is arranged to be coupled to one of the pair of bus conductors, i.e. a conductor that carries a time-variational signal at least during an address cycle of the bus. In the context of the present invention, a time-variational signal is a signal that assumes a logic high state during a first time interval and a logic low state during another time interval.

It will be apparent that an appropriate logic gate 112 connected as described above can readily distinguish between the pair of conductors carrying signals that represent complementary fixed logic values, e.g. a supply voltage Vdd and ground. For instance, in case of the logic gate 112 being an AND gate, the output of the logic gate 112 will never reach a logic high when its associated address pin, e.g. address pin 106a, is connected to ground, whereas it will reach a logic high when its associated address pin is connected to Vdd and a logic high is detected on its other input. Similarly, in case of the logic gate 112 being a NOR gate, the output of the logic gate 112 will never reach a logic high when its associated address pin, e.g. address pin 106a, is connected to Vdd, whereas it will reach a logic high when its associated address pin is connected to ground and a logic low is detected on its other input.

The output of each logic gate 112 is coupled to a respective sequential element 116 for capturing the detection of a logic high on the output of the logic gate 116. To this end, the sequential elements 116 are arranged to reset to a predefined logic value, e.g. a logic '0', with their respective data terminals D coupled to a complementary fixed logic value source 130, e.g. a pull-up transistor providing a logic '1'. Alternative arrangements for the provision of the logic value on these data terminals as discussed for edge-triggered sequential elements 118 are also feasible for sequential elements 116. It will be appreciated that the sequential elements 116 may be edge-triggered sequential elements, although this is not a necessity.

In order to make the logic gates suitable to distinguish between the two conductors of the data communication bus, i.e. between two conductors carrying time-variational signals, one of the inputs of the logic gate 112 should be an inverting input. This way, if both inputs of the logic gate 112, e.g. an AND gate or a NOR gate, are connected to the same conductor, the respective logic values on its inputs will be complementary by definition, which means that the logic gate 112 will never produce a logic high for such an arrangement.

To avoid spurious logic high outputs by the logic gate 112, which may be caused if one of the two signals provided to the respective inputs of the logic gate 112 experiences a delay compared to the other signal, a signal spike filter 114 may be provided between the logic gate 112 and the sequential element 116. The spike filter 114 typically suppresses a logic high on the signal line on which it is placed for a predefined period of time. This predefined period typically is a fraction of a single clock cycle only in case of clocked systems to ensure that only unintentional logic highs, e.g. signal spikes, are filtered out.

The bus address decoder 110 is typically arranged to decode the bus address of the IC 100 during an address communication cycle of the data communication bus to which the IC 100 is connected. For instance, in case of an I²C bus using enhanced addressing, the bus address decoder 110 will receive a sequence of six bits indicating the target address specified by another device coupled to the data communication bus. It is pointed out that the number of six bits is appropriate for an IC having three address pins, and that other numbers of bits may be used when the IC has a different number of address pins. After the reception of these six bits, the bus address decoder 110 will evaluate the contents of the sequential elements 116 and the edge-triggered sequential elements 118 to determine to which conductor the respective associated address pins 106a-c are coupled.

Table I gives the status of the sequential element pair 116, 118 after completion of an address cycle on the data communication bus in case an AND gate is used as logic gate 112 with the input of the logic gate 112 that is not coupled to the address pin being coupled to the clock signal conductor SCL of the data communication bus. All the sequential elements 116, 118 are configured to initialize or reset to a logic '0' with their data terminals D tied to a logic '1'.

TABLE I

| Pin 106 connection | Seq. element 116 | Seq. element 118 |
|---|---|---|
| VDD | 1 | 0 |
| Ground | 0 | 0 |
| SCL | 0 | 1 |
| SDA | 1 | 1 |

Table II gives the status of the sequential element pair 116, 118 for the same arrangement as for Table I except that the input of the logic gate 112 that is not coupled to the address pin is coupled to the data signal conductor SDA of the data communication bus. The corresponding truth tables in case the logic gate 112 is a NOR gate will be apparent to the skilled person.

TABLE II

| Pin 106 connection | Seq. element 116 | Seq. element 118 |
|---|---|---|
| VDD | 1 | 0 |
| Ground | 0 | 0 |
| SCL | 1 | 1 |
| SDA | 0 | 1 |

It will be apparent from both truth tables in Tables I and II that the value stored in sequential element 116 provides a distinction between the conductors within a single pair of conductors, i.e. the pair of conductors carrying a time-constant signal (Vdd, ground) and the pair of conductors carrying a time-variational signal (SCL, SDA), whereas the value stored in sequential element 118 provides a distinction between the pairs of conductors.

The bus address decoder typically comprises comparison logic 120 to compare the derived bus address of the IC 100 with the specified address received from the data communication bus. This may be implemented by means of direct comparison. For instance, in an arrangement where pin 106a is connected to Vdd, and pin 106b and 106c are both connected to data signal conductor SDA, with each logic gate 112 being an AND gate having its input that is not connected to one of the address pins 106a-c connected to synchronization signal conductor SCL, the bit pattern stored in the respective sequential elements 116 and 118 would be 101111. This bit pattern may be directly compared with the bit pattern received through first further data pin 102.

Alternatively, the bus address decoder 110 may use an indirect comparison technique, in which case the bus address decoder 110 may comprise a look-up table 122 in which the possible bit patterns derived from the sequential elements 116 and 118 are each mapped against a further bit pattern. In such an arrangement, the comparison logic 120 is arranged to find the further bit pattern that matches the bit pattern of the specified address received through first further pin 102 and compare its corresponding possible bit pattern with the actual bit pattern stored in the sequential elements 116 and 118. Advantageously, the look-up table is stored in a programmable device such as a programmable logic array or a memory, because this allows for the IC addresses to be changed during the lifetime of an electronic device incorporating such an IC 100. It will be appreciated that the implementation of the comparison logic 120 is not crucial to the present invention and that alternative comparison arrangements are equally feasible.

The IC 100 may be configured to reset the sequential elements 116 and 118 at the start or the end of a data communication cycle of the data communication bus by providing the reset terminals R of the sequential elements 116 and 118 with a reset signal. The signal lines facilitating the provision of such a reset signal to the reset terminals R of the sequential elements 116 and 118 have been omitted for reasons of clarity only. Alternatively, the reset terminals R of the sequential elements 116 and 118 may be responsive to a reset signal from a controller external to the IC 100. The reception of a reset signal will trigger each sequential element 118 to assume its initial logic state.

At this point, it is reiterated that the IC 100 shown in FIG. 1 has three address pins 106a-c by way of non-limiting example only. The IC 100 may have more or less address pins depending of the intended data communication bus requirements or specifications. In addition, the application of the present invention, although particularly suitable for use with an $I^2C$ bus system using enhanced addressing, is not limited to this particular bus system.

FIG. 2 depicts an electronic device 200 comprising a first IC 100a and a second IC 100b coupled to a data communication bus 220, e.g. an $I^2C$ bus using an enhanced addressing scheme. It will be obvious that many more devices may be coupled to the data communication bus 220. At least one of the ICs 100a, 100b is an IC according to the present invention, e.g. an IC 100 as shown in FIG. 1. By way of non-limiting example, IC 100a has its address pins 106 respectively coupled to VDD, SCL and GND (ground), and IC 100b has its address pins 106 respectively coupled to SDA, VDD and SCL. If the ICs 100a and 100b are connected in accordance with the truth table shown in Table I, this would correspond to a bus address 100100 for IC 100a, and a bus address 111001 for IC 100b. The electronic device 200 benefits from the compact bus address decoder of the IC 100 of the present invention because the small number of components in the address decoder 110 of the IC 100 of the present invention means that the overall area and power consumption of the electronic device 200 is reduced compared to prior art devices.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrated circuit for communicating over a data communication bus comprising a first pair of conductors including a data signal conductor and a synchronization signal conductor, the integrated circuit comprising:
a group of address pins for defining the bus address of the integrated circuit (100), each address pin being arranged to be coupled to a conductor from a group of conductors comprising the first pair of conductors and a second pair of conductors including a conductor for carrying a fixed high potential and a conductor for carrying an fixed low potential;
first and second further pins for being coupled to the data signal conductor and the synchronization signal conductor respectively; and
a bus address decoder comprising, for each address pin:
first means for distinguishing between the first pair of conductors and the second pair of conductors; and
second means for distinguishing between the conductors belonging to the same pair of conductors.

2. An integrated circuit as claimed in claim 1, wherein each first means and second means comprise a sequential element having a data terminal coupled to a fixed logic value that is the complement of the logic value assumed by the sequential element in an initial state and a control terminal coupled to its associated address pin;
the sequential element of each first means being an edge-triggered sequential element, and
the control terminal of the sequential element of each second means being coupled to its associated address pin via a logic gate having a first input coupled to the associated address pin and a second input arranged to be coupled to a conductor from the first pair of conductors, one of the first and second input of the logic gate being an inverting input.

3. An integrated circuit as claimed in claim 1, wherein the bus address decoder is further coupled to the first further pin, and is arranged to receive an address bit pattern through the first further pin and to compare the received address bit pattern with the decoded bus address.

4. An integrated circuit as claimed in claim 3, wherein the bus address decoder comprises a look-up table stored in a programmable logic device, the look-up table comprising a plurality of address bit patterns in a first column and a corresponding plurality of combinations of three conductors from the group of conductors in a second column, the bus address decoder being arranged to locate the received address bit pattern in the look-up table and to compare the corresponding conductor combination in the look-up table with the conductor combination derived from the group of address pins.

5. An integrated circuit as claimed in claim 2, wherein the control input of the edge-triggered sequential element of the second means is coupled to the logic gate via a signal spike filter.

6. An integrated circuit as claimed in claim 2, wherein each sequential element comprises a reset terminal responsive to a reset signal indicating the start or termination of a data communication over the data communication bus, each sequential element being arranged to assume its initial state logic value in response to the reset signal.

7. An integrated circuit as claimed in claim 2, wherein the respective logic gates are AND gates.

8. An integrated circuit as claimed in claim 2, wherein the respective logic gates are NOR gates.

9. An electronic device comprising:
a data communication bus comprising a first pair of conductors including a data signal conductor and a synchronization signal conductor;
a second pair of conductors including a first conductor for carrying a fixed high potential and a further conductor for carrying a fixed low potential; and
an integrated circuit as claimed in claim 1, the integrated circuit having:
the first further pin coupled to the data signal conductor;
the second further pin coupled to the synchronization signal conductor; and
each address pin of the group of address pins coupled to a conductor from the first pair of conductors or the second pair of conductors.

10. An electronic device as claimed in claim 9, wherein the data communication bus is an $I^2C$ bus.

* * * * *